United States Patent [19]
Wang

[11] Patent Number: 5,950,528
[45] Date of Patent: Sep. 14, 1999

[54] FRUIT PEELING MACHINE

[76] Inventor: Yu-Chang Wang, No. 11-5, Lane 470, Sec. 2, Sha Tian Road, Ta Du Hsian, Taichung Hsien, Taiwan

[21] Appl. No.: 09/281,258

[22] Filed: Mar. 30, 1999

[51] Int. Cl.⁶ .............................. A23N 7/00; A47J 17/04; A47J 43/28
[52] U.S. Cl. ................................ 99/542; 99/595; 99/598; 99/599
[58] Field of Search .............................. 99/515, 539–544, 99/584, 587, 588–599, 623; 426/481–483

[56] References Cited

U.S. PATENT DOCUMENTS

| 243,035 | 6/1881 | Geer | 99/542 |
|---|---|---|---|
| 256,214 | 4/1882 | Heizmann | 99/599 X |
| 256,800 | 4/1882 | Holton | 99/595 |
| 273,418 | 3/1883 | Whittemore | 99/598 X |
| 281,559 | 7/1883 | Rippien | 99/542 |
| 292,554 | 1/1884 | Geer | 99/595 X |
| 303,490 | 8/1884 | Clark | 99/542 X |
| 319,905 | 6/1885 | Hudson | 99/599 X |
| 360,527 | 4/1887 | Hudson | 99/595 |
| 1,773,267 | 8/1930 | Happe | 99/584 X |
| 2,056,843 | 10/1936 | Erro | 99/542 X |
| 5,558,011 | 9/1996 | Heim | 99/595 |
| 5,690,022 | 11/1997 | Chai | 99/590 |

*Primary Examiner*—Timothy Simone
*Attorney, Agent, or Firm*—Browdy and Neimark

[57] ABSTRACT

A fruit peeling machine comprises a base, a transmission rod, an engagement device, a fruit fastening member, and a peeling tool. The transmission rod is rotatably and slidably mounted on the base and provided with at least two spiral slots different from each other in guide range and forming on the transmission rod a meeting place and a separating place which is separated from the meeting place by a distance. The fruit fastening member is fastened with the front end of the transmission rod. The peeling tool is mounted on the base to facilitate the peeling of the fruit held by the fruit fastening member. The engagement device is mounted on the base and composed of at least two engaging members each having two engaging teeth engageable with the spiral slots to enable said transmission rod to displace variously in the direction of the longitudinal axis of the transmission rod at the time when the transmission rod is rotated.

5 Claims, 6 Drawing Sheets

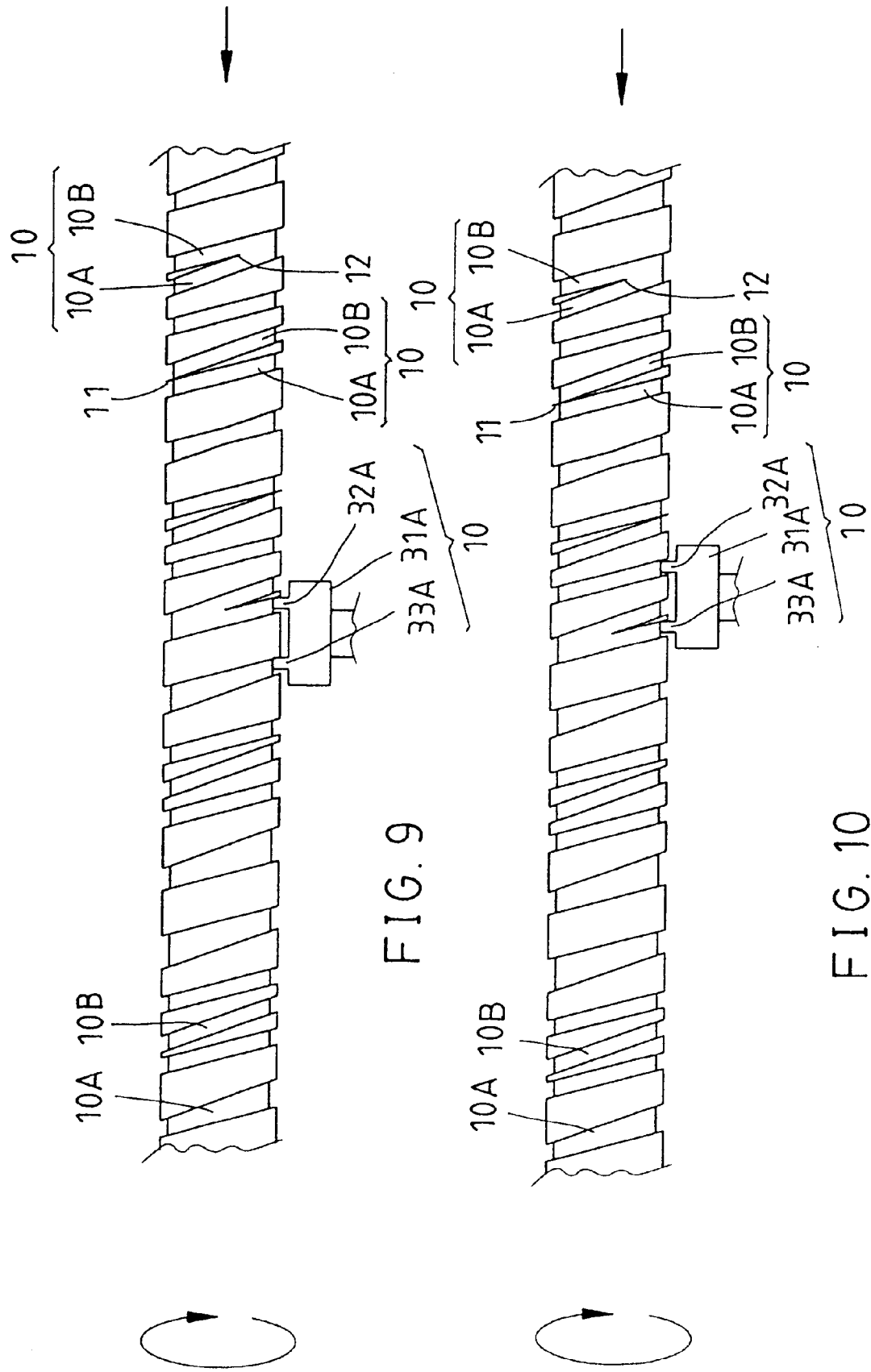

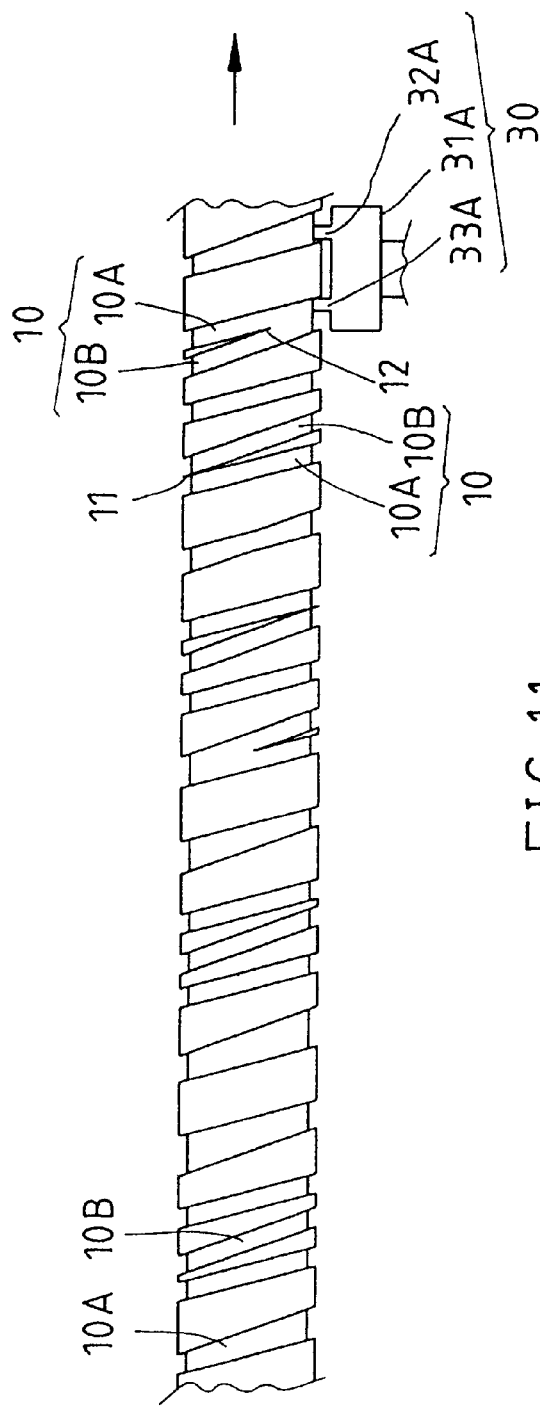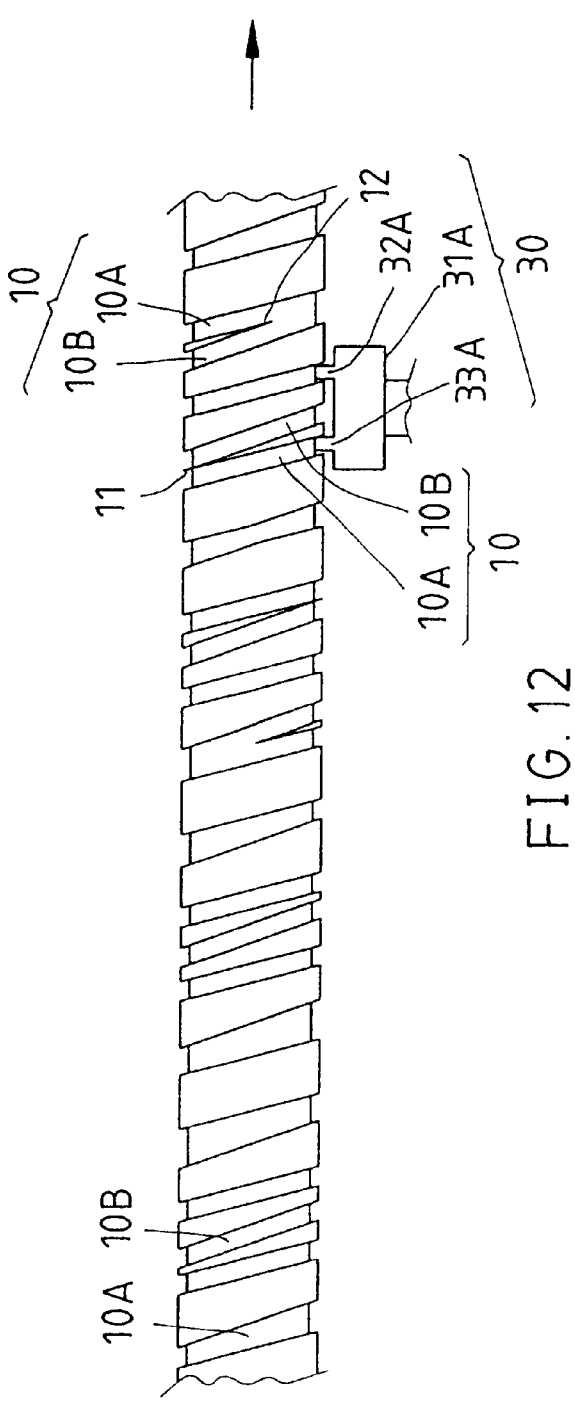

FRUIT PEELING MACHINE

FIELD OF THE INVENTION

The present invention relates generally to a fruit processing machine, and more particularly to a fruit peeling machine.

BACKGROUND OF THE INVENTION

A fruit peeling machine of the prior art is mainly composed of a base that can be rested securely on a table top, a transmission rod slidably and rotatably mounted on the base and provided with a spiral slot, an L-shaped handle fastened with one end of the transmission rod for turning the transmission rod manually, a fastening member for fastening other end of the transmission rod and having three claws for holding a fruit to be peeled, an engagement member mounted on the base and provided with an engaging gear which is engaged with the spiral slot of the transmission rod, and a peeling tool mounted on the base. As the handle is turned manually to actuate the transmission rod to move on the base along the direction of the logitudinal axis of the base, the fruit is actuated to turn and move linearly to facilitate the peeling of the fruit by the peeling tool.

The ratio between the number of the axial rotation of the transmission rod and the quantity of the axial displacement of the transmission rod is fixed. In other words, when various fruits are peeled by the prior art machine, all fruits have the same ratio between the quantity of linear displacement and the number of rotation. In fact, various fruits are different from one another in volume and surface curvature. For this reason, various fruits are different in requirements of the ratio between the quantity of linear displacement and the number of rotation. The fruit peeling machine of the prior art described above is therefore incapable of peeling fruits effectively.

SUMMARY OF THE INVENTION

The primary objective of the present invention is therefore to provide a fruit peeling machine having a transmission rod which can be adjusted in ratio between the quantity of the axial displacement of the transmission rod and the number of rotation of the transmission rod.

In keeping with the principle of the present invention, the foregoing objective of the present invention is attained by the fruit peeling machine, which is composed of a base, a transmission rod, an engagement device, a fastening member, and a peeling tool. The transmission rod is slidably and rotatably mounted on the base and is provided with at least two spiral slots different from each other in guide range so as to enable the two spiral slots to bring about on the transmission rod a meeting place and a separating place. There is a predetermined interval between the meeting place and the separating place. The engagement device is mounted on the base and composed of at least two engaging members each having two engaging teeth engageable with the two spiral slots. The fastening member is mounted at the front end of the transmission rod for holding securely fruit to be peeled. The peeling tool is mounted on the base for peeling the fruit held by the fastening member. The ratio between the quantity of the axial displacement of the transmission rod and the number of rotation of the transmission rod can be changed by causing one of the engaging members to engage the transmission rod. As the transmission rod is moved axially on the base, the fruit fastened by the fastening member is actuated to move linearly and rotate at the same time so as to facilitate the peeling of the fruit by the peeling tool.

BRIEF DESCRIPTION OF THE DRAWINGS

FIGS. 9–12 are schematic views showing various states of engagement of the first and the second engaging teeth of the first engaging member with the first spiral slot of the transmission rod at the time when the first and the second engaging teeth slide in the first spiral slot according to the preferred embodiment of the present invention.

DETAILED DESCRIPTION OF THE INVENTION

Figure 1:
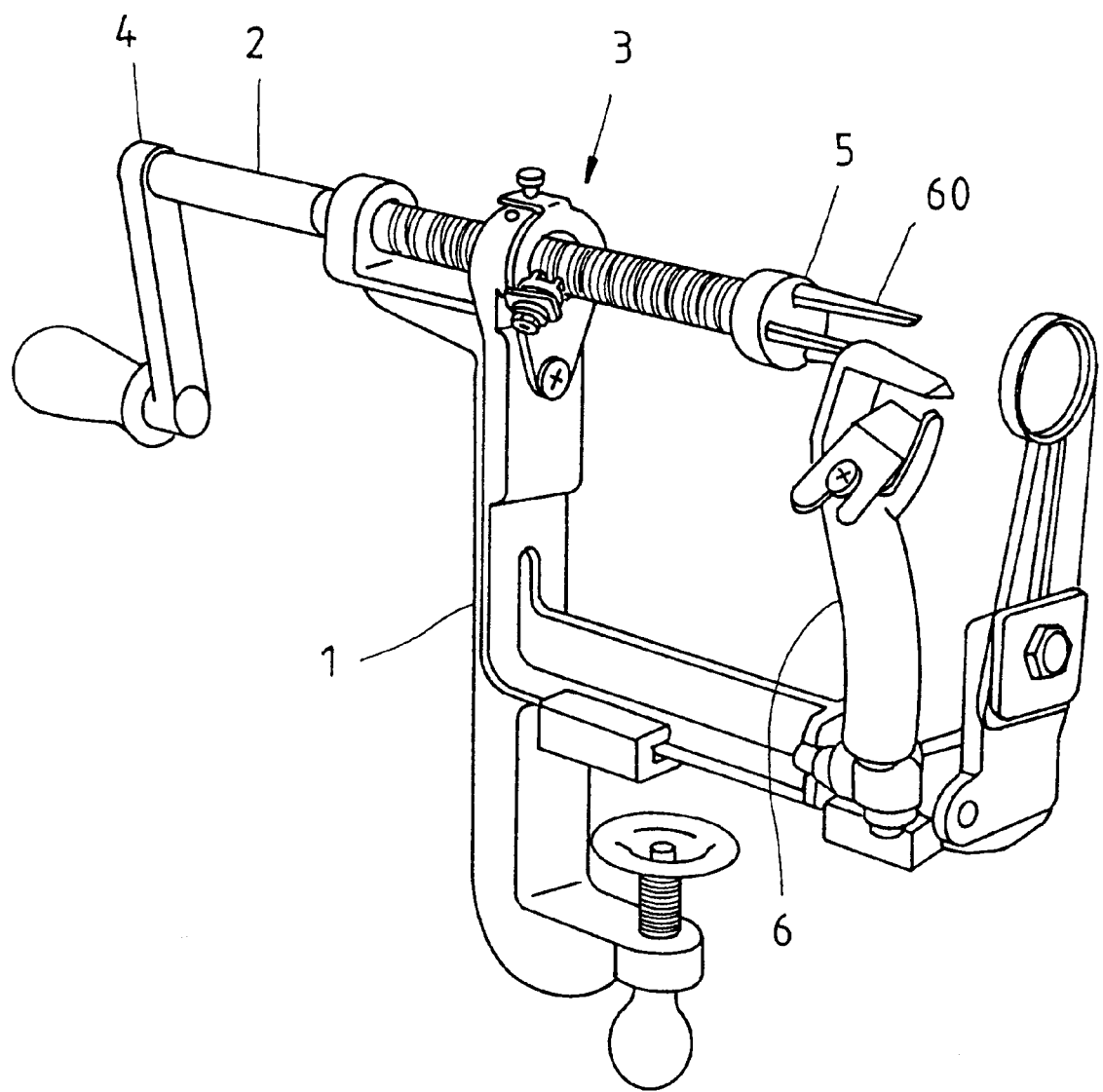
FIG. 1 shows a perspective view of a preferred embodiment of the present invention.
Figure 2:
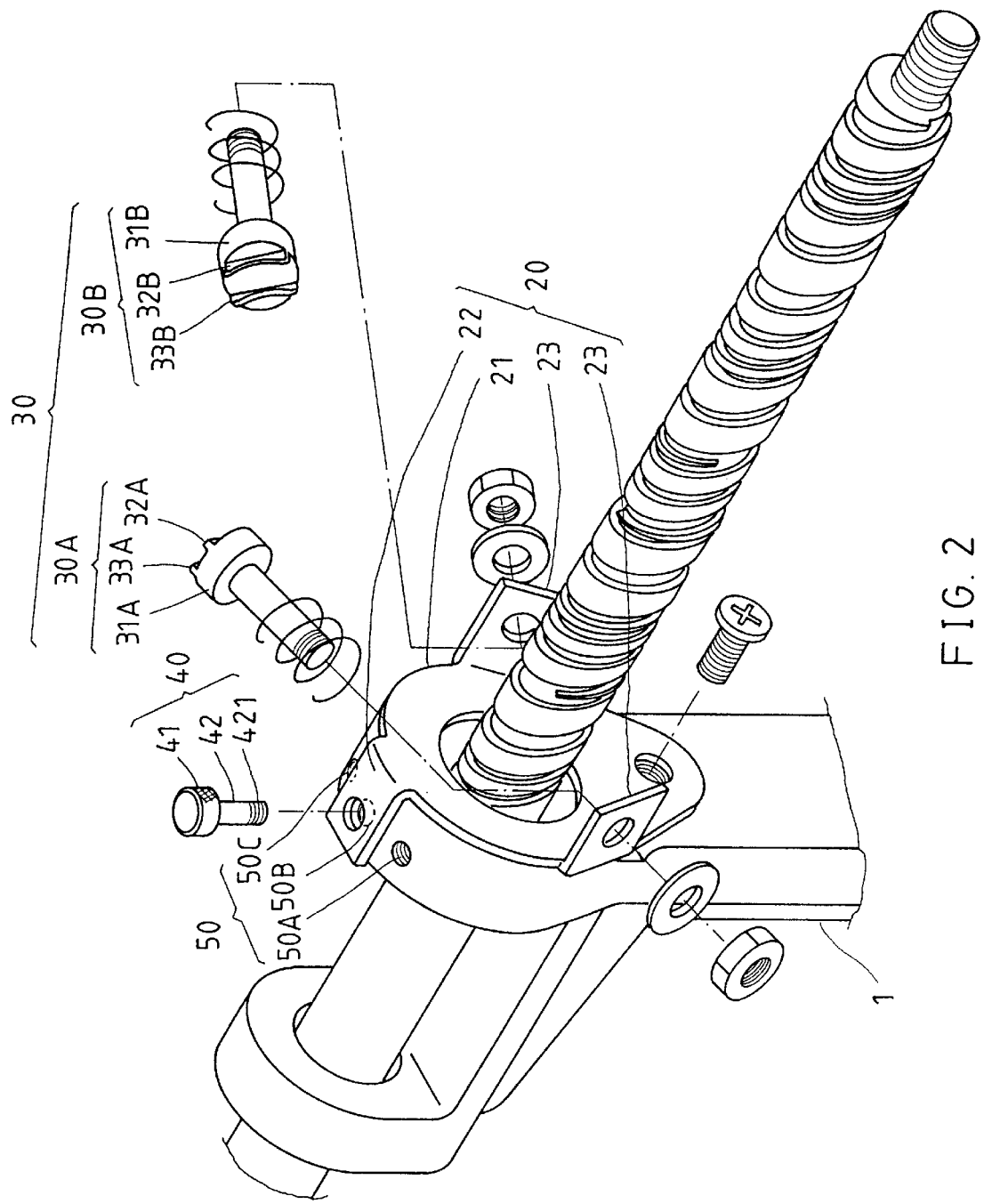
FIG. 2 shows an exploded view of an engagement device of the preferred embodiment of the present invention.
Figure 3:
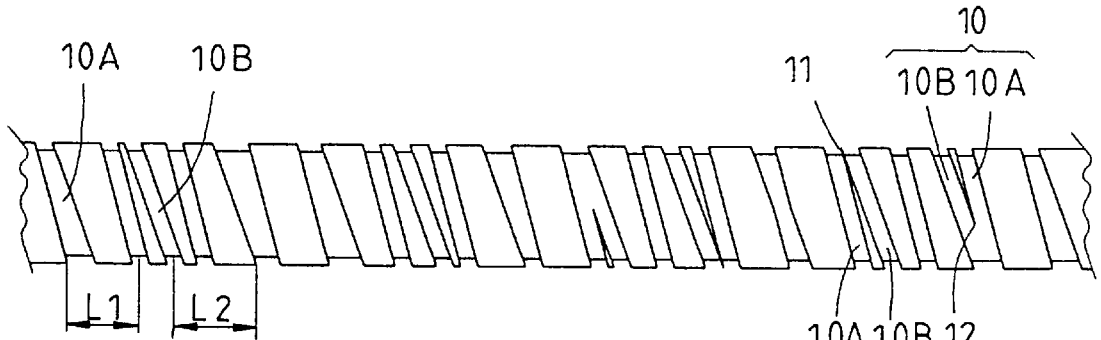
FIG. 3 shows a partial enlarged view of a transmission rod of the preferred embodiment of the present invention.

As shown in FIGS. 1–8, a fruit peeling machine of the preferred embodiment of the present invention comprises a plurality of components, which are described hereinafter.

A base 1 is provided with a means for fastening the fruit peeling machine on a table top so as to facilitate the peeling of fruits.

A transmission rod 2 is mounted slidably and rotatably on the base 1 such that the transmission rod 2 can be turned, and that the transmission rod 2 can be displaced along the direction of a longitudinal axis thereof. The transmission rod 2 is provided in the outer surface thereof with two spiral slots 10, which are conveniently designated as a first spiral slot 10A and a second spiral slot 10B. The first spiral slot 10A has a guide range L1, whereas the second spiral slot 10B has a guide range L2, which is different from L1 so as to enable the first spiral slot 10A and the second spiral slot 10B to bring about a meeting place 11 and a separating place 12 separated from the meeting place 11 at a predetermined interval.

An engagement device 3 comprises a switching frame 20, two engaging members 30, and a locating member 40. The switching frame 20 has a main body 21 provided at the center with a through hole 211, a support plate 22 located at the top edge of the main body 21, and two second support plates 23 located oppositely on two side edges of the main body 21.

Figure 4:
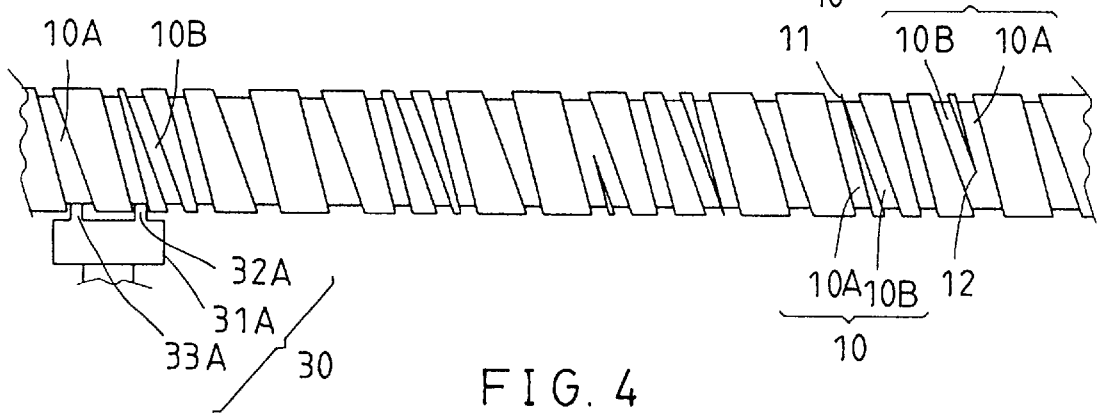
FIG. 4 is a schematic view showing that a first and a second engaging teeth of a first engaging member are engaged with a first spiral slot of the transmission rod according to the preferred embodiment of the present invention.
Figure 5:
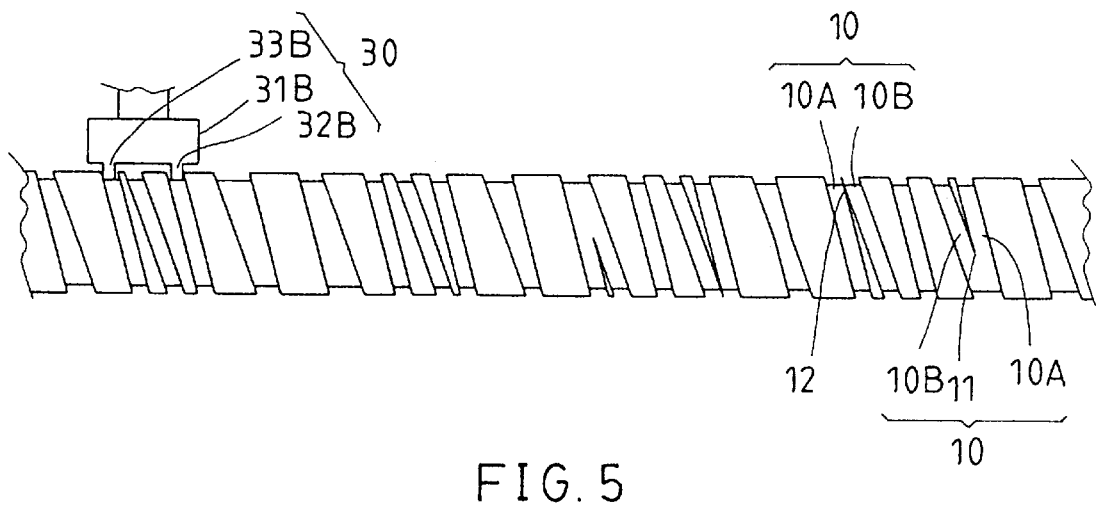
FIG. 5 is a schematic view showing that a third and a fourth engaging teeth of a second engaging member are engaged with a second spiral slot of the transmission rod according to the preferred embodiment of the present invention.

The two engaging members 30 are conveniently designated as a first engaging member 30A and a second engaging member 30B. The first engaging member 30A has a first base body 31A which is provided with a first engaging tooth 32A and a second engaging tooth 33A parallel to the first engaging tooth 32A. The first engaging tooth 32A and the second engaging tooth 33A are separated from each other by a distance equal to the guide range L1 of the first spiral slot 10A. The first and the second engaging teeth 32A and 33A have a width which is slightly smaller than the slot width of the first spiral slot 10A. The first and the second engaging teeth 32A and 33A can be simultaneously engaged with the first spiral slot 10A such that they remain apart by a distance equal to the guide range L1, as shown in FIG. 4. The second engaging member 30B has a second base body 31B which is provided with a third engaging tooth 32B and a fourth engaging tooth 33B which is parallel to the third engaging tooth 32B and is separated from the third engaging tooth 32B by a distance equal to the guide range L2 of the second spiral slot 10B. The third and the fourth engaging teeth 32B and 33B have a width smaller than the slot width of the second spiral slot 10B. The third and the fourth engaging teeth 32B and 33B can be simultaneously engaged with the second spiral slot 10B such that they remain apart by a distance equal to the guide range L2 of the second spiral slot 10B, as shown in FIG. 5. The first and the second engaging members 30A and 30B are mounted respectively on the two second support plates 23 such that the first and the second engaging teeth 32A and 33A, and the third and the fourth engaging teeth 32B and 33B face respectively the through hole 211 of the main body 21 of the switching frame 20.

The locating member 40 has a head 41, and a shank 42 which is provided with outer threads 421 for fastening the shank 42 with the first support plate 22 of the switching frame 20.

The engagement device 3 is fastened pivotally on the base 1 by the main body 21 of the switching frame 20 such that the transmission rod 2 is put through the through hole 211 of the main body 21, and that the first and the second engaging members 30A and 30B are respectively located at two sides of the transmission rod 2. The switching frame 20 is capable of swiveling in a reciprocating manner between a first position and a second position. When the switching frame 20 is located at the first position and the second position, the engaging teeth of the first and the second engaging members 30A and 30B are respectively engaged with the first and the second spiral slots 10A and 10B of the transmission rod 2.

Figure 6:
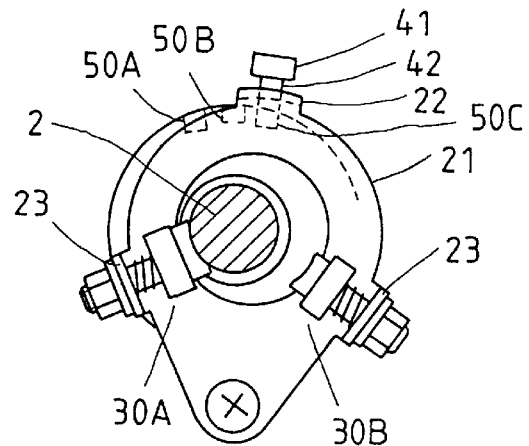
FIGS. 6–8 are schematic views showing the relationships between the transmission rod and the first and the second engaging members at the time when a switching frame is located at three different positions according to the preferred embodiment of the present invention.
Figure 7:
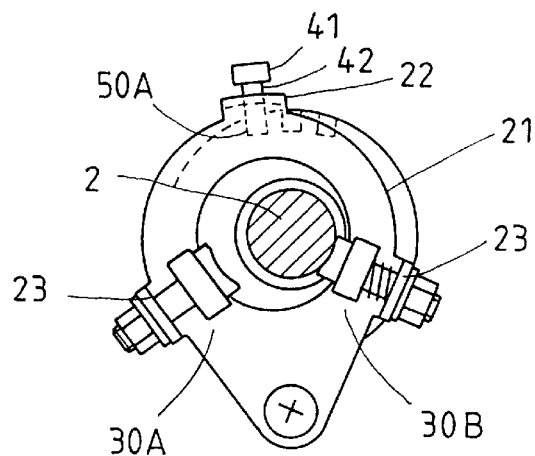
Figure 8:
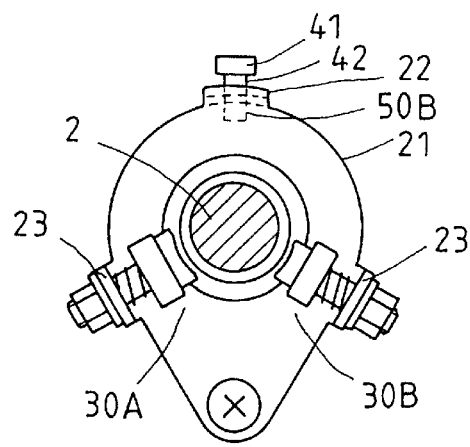

When the main body 21 swivels back and forth on the base 1, the locating member 40 is caused to move back and forth along a predetermined path. The main body 21 is provided with three threaded holes 50 which are corresponding in location to the movement path and are conveniently designated as a first threaded hole 50A, a second threaded hole 50B, and a third threaded hole 50C, which are engageable with the outer threads 421 of the locating member 40. When the locating member 40 is fastened with the third threaded hole 50C, the switching frame 20 is located at the first position. As a result, the first and the second engaging teeth 32A and 33A of the first engaging member 30A are engaged with the first spiral slot 10A, as shown in FIG. 6. When the locating member 40 is fastened with the first threaded hole 50A, the switching frame 20 is located at the second position, thereby resulting in the engagement of the third and the fourth teeth 32B and 33B of the second engaging member 30B with the second spiral slot 10B, as shown in FIG. 7. When the locating member 20 is fastened with the second threaded hole 50B, the first and the second engaging members 30A and 30B do not engage the transmission rod 2, as shown in FIG. 8.

An L-shaped handle 4 is fastened with a rear end of the transmission rod 2 such that the handle 4 can be turned manually to actuate the transmission rod 2.

A fruit fastening member 5 is fastened with a front end of the transmission rod 2 and is provided with three forked claws 60 for holding securely a fruit to be peeled.

A peeling tool 6 is mounted on the base 1 such that the peeling tool 6 is located by the front end of the transmission rod 2.

In operation, the switching frame 20 is swiveled to the first position or the second position so as to enable the first and the second engaging teeth 32A and 33A of the first engaging member 30A, or the third and the fourth engaging teeth 32B and 33B of the second engaging member 30B to be engaged with the first spiral slot 10A or the second spiral slot 10B. Thereafter, the locating member 40 is fastened with the first threaded hole 50A or the third threaded hole 50C. The transmission rod 2 is actuated to turn by the handle 4, so as to force the first and the second engaging teeth 32A and 33B of the first engaging member 30A, or the third and the fourth engaging teeth 32B and 33B of the second engaging member 30B to slide along the first spiral slot 10A or the second spiral slot 10B. In light of the first and the second engaging members 30A and 30B being stationary, the transmission rod 2 is forced to move in the direction of the longitudinal axis thereof to actuate the fruit held by the fruit fastening member 5 to move linearly and rotate so as to facilitate the peeling of the fruit by the peeling tool 6.

As shown in FIGS. 9–10, the first engaging tooth 32A is guided by the second engaging tooth 33A to slide accurately into the first spiral slot 10A at the time when the first engaging tooth 32A has approached the separating place 12 of the first and the second spiral slots 10A and 10B. Similarly, the second engaging tooth 33A is guided by the first engaging tooth 32A to slide precisely into the first spiral slot 10A at such time when the second engaging tooth 33A has approached the separating place 12 of the first and the second spiral slots 10A and 10B. As a result, the transmission rod 2 is capable of sliding linearly and smoothly in a reciprocating manner along the direction of the longitudinal axis thereof.

The manner in which the third and the fourth engaging teeth 32B and 33B of the second engaging member 30B slide in the second spiral slot 10B is similar to the manner described above.

The present invention is characterized that the first spiral slot 10A and the second spiral slot 10B of the transmission rod 2 have different guide ranges. As a result, when the first engaging member 30A is engaged with the first spiral slot 10A, one rotation of the transmission rod 2 results in an axial displacement of the transmission rod 2, which is different in quantity from an axial displacement of the transmission rod 2 at the time when the transmission rod 2 has completed one rotation under the circumstance that the second engaging member 30B is engaged with the second spiral slot 10B. In other words, the magnitude of the ratio between the quantity of the axial displacement and the number of rotation of the transmission rod 2 depends on the engagement of the first engaging member 30A with the first spiral slot 10A, or the engagement of the second engaging member 30B with the second spiral slot 10B. Accordingly, the operator of the fruit peeling machine of the present invention may select one of the two "engagement options" described above, depending on the volume and the surface curvature of fruit to be peeled. The fruit peeling machine of the present invention is therefore capable of peeling fruits more effectively as compared with the fruit peeling machine of the prior art.

What is claimed is:

1. A fruit peeling machine comprising:

a base;

a transmission rod mounted rotatably and slidably on said base such that said transmission rod can be actuated by an external force to displace along the direction of a longitudinal axis of said transmission rod, said transmission rod provided with a first spiral slot and a second spiral slot different in guide range from said first spiral slot so as to form on said transmission rod a meeting place and a separating place which is separated from said meeting place by a distance;

an engagement device mounted on said base and comprising a first engaging member having two engaging teeth which are engageable with said first spiral slot, and a second engaging member having two engaging teeth which are engageable with said second spiral slot;

a fruit fastening member fastened with one end of said transmission rod for holding securely a fruit to be peeled; and a peeling tool mounted on said base for peeling the fruit held by said fruit fastening member;

wherein said transmission rod is actuated by the external force to rotate such that said transmission rod displaces along the direction of the longitudinal axis thereof to actuate the fruit held by said fruit fastening member to move linearly and rotate, at the time when said first engaging member is engaged with said first spiral slot, or when said second engaging member is engaged with said second spiral slot; and wherein a ratio is formed by a quantity of an axial displacement of said transmission rod and a number of rotation of said transmission rod at such time when said first engaging member is engaged with said first spiral slot, said ratio being different from a ratio formed by a quantity of an axial displacement of said transmission rod and a number of rotation of said transmission rod at such time when said second engaging member is engaged with said second spiral slot.

2. The fruit peeling machine as defined in claim 1, wherein said first engaging member has a base body from which said two engaging teeth are extended such that said two engaging teeth are parallel to each other, and that said two engaging teeth are separated by a distance equal to said guide range of said first spiral slot, and further that said two engaging teeth are smaller in width than said first spiral slot; and wherein said second engaging member has a base body from which said two engaging teeth are extended such that said two engaging teeth are parallel to each other, and that said two engaging teeth are separated by a distance equal to said guide range of said second spiral slot, and further that said two engaging teeth are smaller in width than said second spiral slot.

3. The fruit peeling machine as defined in claim 2, wherein said engagement device further comprises a switching frame and a locating member, said switching frame having a main body provided with a through hole, said switching frame further having one first support plate located at a top edge of said main body, and two second support plates located at two opposite sides of said main body, said locating member having a head, and a shank which is provided with outer threads; wherein said first engaging member and said second engaging member are respectively mounted on said two second support plates such that said engaging teeth of said first engaging member and said second engaging member face said through hole of said main body of said switching frame; wherein said engagement device is fastened pivotally with said base by said main body of said switching frame such that said transmission rod is put through said through hole of said main body and that said first engaging member and said second engaging member are located a two sides of said transmission rod; wherein said switching frame swivels back and forth between a first position and a second position, with said switching frame being located at said first position at such time when said engaging teeth of said first engaging member are engaged with said first spiral slot, and with said switching frame being located at said second position at such time when said engaging teeth of said second engaging member are engaged with said second spiral slot; wherein said locating member is caused to move back and forth along a path by said main body in a reciprocating motion; wherein said main body is provided with a first threaded hole, a second threaded hole and a third threaded hole, which are engageable with said outer threads of said locating member; and wherein said switching frame is located at said first position to enable said engaging teeth of said first engaging member to engage said first spiral slot at such time when said locating member is fastened with said first threaded hole, said switching frame being located at said second position to enable said engaging teeth of said second engaging member to engage said second spiral slot at such time when said locating member is fastened with said third threaded hole, said engaging teeth of said first engaging member and said second engaging member being unable to engage said transmission rod at such time when said locating member is fastened with said second threaded hole.

4. The fruit peeling machine as defined in claim 1 further comprising an L-shaped handle fastened with other end of said transmission rod for actuating said transmission rod to rotate.

5. The fruit peeling machine as defined in claim 1, wherein said fruit fastening member has three forked claws for holding securely a fruit to be peeled by said peeling tool.

* * * * *